(12) United States Patent
Malloy et al.

(10) Patent No.: US 8,195,443 B2
(45) Date of Patent: Jun. 5, 2012

(54) APPLICATION LEVEL INTERFACE TO NETWORK ANALYSIS TOOLS

(75) Inventors: Patrick J. Malloy, Washington, DC (US); Alain Cohen, Washington, DC (US); William E. Bardon, Jr., Olney, MD (US); Antoine Dunn, San Mateo, CA (US); Ryan Gehl, Washington, DC (US); Nishant Gupta, Rockville, MD (US); Mahesh Lavannis, Rockville, MD (US); John Strohm, Bethesda, MD (US); Prasanna Sukumar, Germantown, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 1335 days.

(21) Appl. No.: 11/358,536

(22) Filed: Feb. 21, 2006

(65) Prior Publication Data

US 2006/0190236 A1  Aug. 24, 2006

Related U.S. Application Data

(60) Provisional application No. 60/654,073, filed on Feb. 18, 2005.

(51) Int. Cl.
| | |
|---|---|
| *G06F 7/60* | (2006.01) |
| *G06F 17/50* | (2006.01) |
| *G06F 9/44* | (2006.01) |
| *G06F 9/45* | (2006.01) |
| *G06F 9/46* | (2006.01) |
| *G06F 15/16* | (2006.01) |
| *G06F 15/177* | (2006.01) |
| *G06F 15/173* | (2006.01) |

(52) U.S. Cl. .......... 703/17; 703/2; 703/13; 703/21; 703/22; 718/101; 709/201; 709/220; 709/223; 709/227; 709/230

(58) Field of Classification Search .......... 703/2, 13, 703/17, 21, 22; 718/101; 709/201, 220, 709/223, 227, 230, 238
See application file for complete search history.

(56) References Cited

U.S. PATENT DOCUMENTS

| | | | |
|---|---|---|---|
| 5,768,552 A | 6/1998 | Jacoby | |
| 6,134,514 A * | 10/2000 | Liu et al. .......... | 703/17 |
| 7,197,573 B1 * | 3/2007 | Jacobson et al. .......... | 709/239 |
| 2001/0013105 A1 * | 8/2001 | Kang et al. .......... | 714/43 |

OTHER PUBLICATIONS

"Efficient Simulation of Message-Passing in Distributed-Memory Architectures" Eric Demain. Warterloo, Ontario, Canada,1996.*
"Network Simulator 2: a Simulation Tool for Linux" Ibrahim Haddad. Oct. 21, 2002.*
"ParaGraph: A Tool for Visualizing Performance of Parallel Programs" Heath. Sep. 1, 1994.*
U.S. Appl. No. 11/358,538, filed Feb. 21, 2006, Malloy et al.

* cited by examiner

*Primary Examiner* — Kandasamy Thangavelu
*Assistant Examiner* — Nithya Janakiraman
(74) *Attorney, Agent, or Firm* — Robert M. McDermott

(57) ABSTRACT

A user interface to a network simulator facilitates the use of application layer parameters and application layer logic. The user interface is configured to allow the user to define the input in a graphic form, or a text/programming form, or a combination of both. Preferably, the user interface provides common graphic forms for both inputting the data to the simulator as well as for displaying the resultant data from the simulator, thereby easing the progression from the analysis of output from one simulation to the generation of new input for a subsequent simulation.

32 Claims, 9 Drawing Sheets

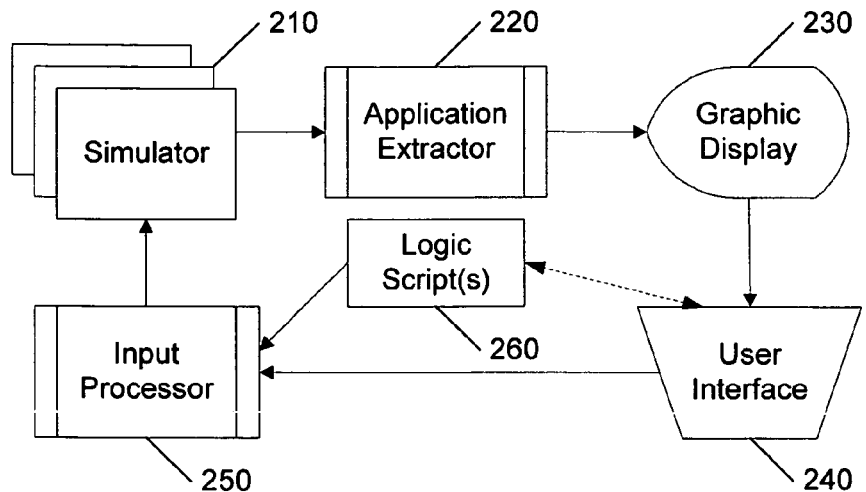
FIG. 2
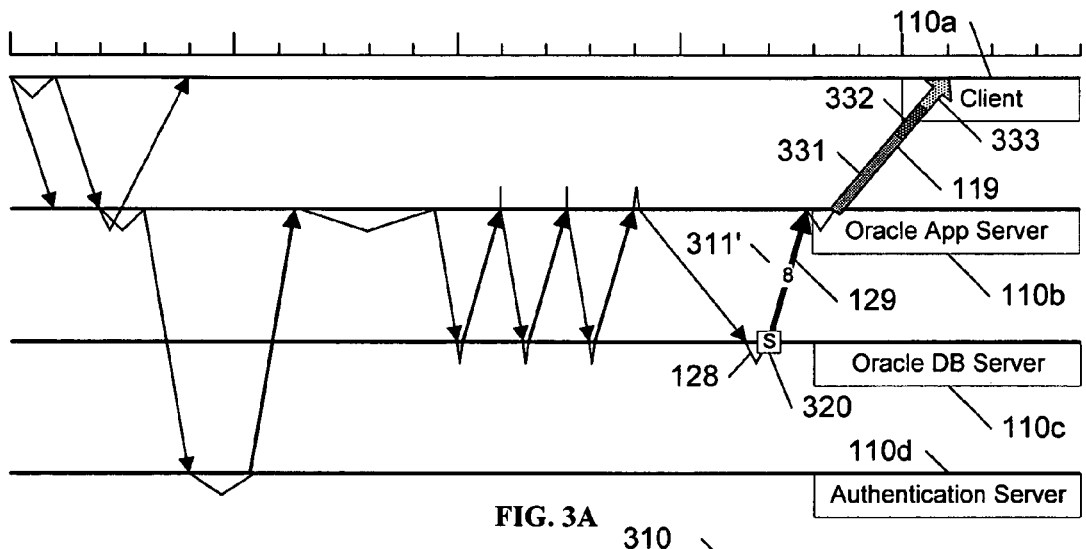
FIG. 3A
FIG. 3B
FIG. 3C

```
#signature: def init (self, action):

# Get the values of the parameters
num_rows = self.get_parameter ('num_rows')           /410
prefetch_count = self.get_parameter ('prefetch_count')  /412

# Determine the response size and the number of loops
#    based on the values of the parameters
response_overhead = 53                    /420
bytes_per_row = 55                                                      /424
                     422
response_size = response_overhead + (bytes_per_row * prefetch_count)

# Determine the number of iterative loops required, rounded up
num_loops = ceil (1.0 * num_rows/prefetch_count)
                                                  430

# Loop initialization       /440
response_msg = action
                          /445
for i in range (num_loops):        /450 /451  /452    /453         /454
    request_msg = self.create_message (95, 'app_server', 'db_server', response_msg)
    response_msg = self.create_message (response_size, 'db_server', 'app_server',
request_msg)   464       460         461         463         463
    request_msg.cpu_time = .00015
    response_msg.cpu_time = .0018      470
    next i                              471
            475
end
```

FIG. 4

| Parameter | Type | Default Value | Description |
|---|---|---|---|
| num_rows | Integer | 500 | Total number of rows requested |
| prefetch_count | Integer | 1 | Number of rows to fetch at a time |
FIG. 5A
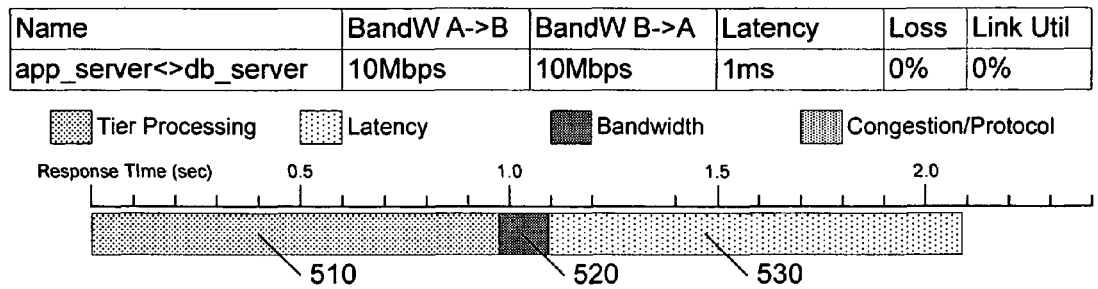
FIG. 5B
```
child_parameters = {'num_rows': 1000, 'prefetch_count':10}
self.invoke_child_task (action, 'db_access_with_prefetch', True, child_parameters)
```
FIG. 6A
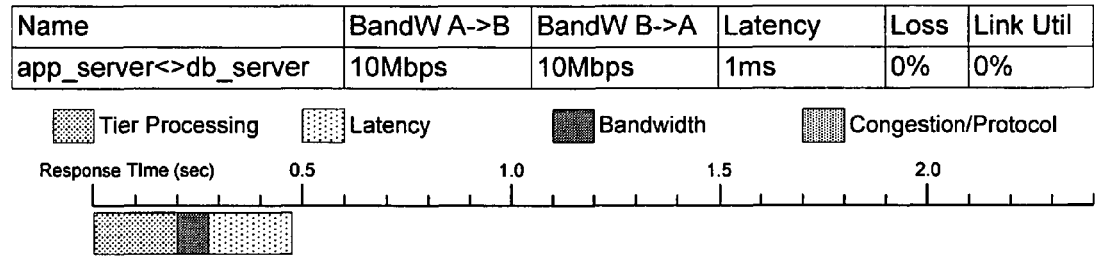
FIG. 6B

APPLICATION LEVEL INTERFACE TO NETWORK ANALYSIS TOOLS

This application claims the benefit of U.S. Provisional Patent Application 60/654,073 filed 18 Feb. 2005.

BACKGROUND AND SUMMARY OF THE INVENTION

This application relates to the field of network analysis, and in particular to a user interface to a network simulation system that facilitates an interactive analysis of the expected performance of an application when deployed on a network.

Network simulators are commonly used to determine the expected performance of a network under a variety of simulated conditions. The interconnection of elements forming a network is modeled, and hypothetical traffic patterns are provided to the model to determine and/or estimate how the modeled network will perform under these traffic conditions. Alternative interconnections and/or configurations of the elements can also be modeled, to perform a "what-if?" analysis, or to diagnose real or assumed problems in the network.

Generally, networks are modeled down at the transport protocol layer, wherein the simulation models the transport of discrete packets among nodes in the network. Traffic approximating the expected traffic in the actual network is simulated and the nodes in the modeled network simulate the processing and propagation of this traffic through the network. Based on this simulation of packet flow, the network performance measures for the nodes and links of the network can be estimated, such as propagation and queuing delays, drop rates, retransmission rates, and so on, In this manner, for example, bottlenecks in network can be identified, and changes to the network simulated to determine whether such bottlenecks are relieved by the changes.

As used herein, the term 'simulation' is used to mean any of a variety of tools available to estimate the performance of a network based on a model of the network and a model of the traffic being passed over the network. Such simulation tools may range from discrete event simulators that model each transmission of packets from nodes, and the subsequent propagation of resultant packets from these and other nodes in the network, to analytic simulators, such as systems that use queuing theory models to determine the overall steady state condition of the network based on analytic models of the network and each node, or simpler models that determine delays based on such factors as available bandwidth, message size, distance between nodes, and so on. Additionally, the actual network may be used to simulate the performance of an application by actually generating messages and packets based on a model of the traffic that an application is expected to generate in use, and collecting performance statistics based on these generated test messages and packets.

Simulation is commonly used to determine how well the network performs when running a variety of select applications, to verify the network's suitability for running these applications, as well as identifying any potential problems with running each application in this network environment. Typically, an application of interest is simulated with traffic from other applications, under a variety of network loading conditions.

Depending upon the capabilities of the simulator, the resultant output can take on a variety of forms. The transmission of packets between nodes of the network can be displayed on traditional timing diagrams, accumulated time between the transmission of a message from a source node to its arrival at its destination node may be represented using a GANTT chart, packets exchanged among tiers of a network may be represented using 'bounce diagrams', and so on.

Typically, a user creates the model of the network, defines the traffic patterns that are to be initiated at a variety of nodes at given times, as well as optionally specifying nondescript background traffic loading of the channels of the network, starts the simulation, and views the results, using, as noted above, any of a variety of output formats to facilitate analysis. To perform a different simulation, for example, to perform different "what-if?" analyses, the user modifies the input data to the simulator, re-starts the simulator, and views the new results.

Traditionally, the typical user of a network simulation tool is a person who designs or manages a network, and is interested in determining how and where to change the network to better handle the needs of the users of the network. As networking has become more and more a part of most computer applications, however, the community of network simulation users has grown to include application developers who are interested in determining how and where to change their applications to better handle the needs of the users of their applications. That is, in today's environment, in addition to addressing the 'internal' performance issues inherent to the execution of an application, the application developer must also address the 'external' performance issues inherent to running the application in a networking environment.

As noted above, most network simulation tools operate at the transport protocol layer, and as such, the traffic patterns that are to be initiated at the various nodes are conventionally defined in terms of packets that are to be generated at each of the nodes. The application developer, on the other hand, deals with the operation of the application at the application protocol layer, and the creation and/or modification of the transport protocol input data to drive a conventional network simulator can be a daunting, and often seemingly impossible task. For example, at the application protocol layer, an application developer may define a task in terms of a client that requests records from a database after completing an authentication exchange. At the network simulation level, on the other hand, the input to the simulator is a set of packets that are to be sent from the client to an authentication server, packets sent from the authentication server to the client, a subsequent set of packets that are to be sent from the client to an application server, packets to be sent from the application server to a database server, and so on.

Due to the dynamic nature of application, it is an objective of this invention to ease the task of creating and/or modifying the input data to a network simulator, and particularly the messages that are to be initiated at the nodes. It is a further objective of this invention to facilitate the creation and/or modification of the input to a network simulator from an application layer perspective. It is a further objective of this invention to integrate the viewing of results from one simulation with the creation and/or modification of input for a subsequent simulation.

These objectives, and others, are achieved by providing a user interface to a network simulator that facilitates the use of application layer parameters and application layer logic. The user interface is configured to allow the user to define the input in a graphic form, or a text/programming form, or a combination of both. Preferably, the user interface provides common graphic forms for both inputting the data to the simulator as well as for displaying the resultant data from the simulator, thereby easing the progression from the analysis of output from one simulation to the generation of new input for a subsequent simulation.

BRIEF DESCRIPTION OF THE DRAWINGS

The invention is explained in further detail, and by way of example, with reference to the accompanying drawings wherein:

FIG. 2 illustrates an example block diagram of a simulation system that supports application level modeling in accordance with this invention.

FIGS. 3A-3C illustrate an example use of scripts in a simulation system that supports application level modeling in accordance with this invention.

FIG. 4 illustrates an example script for defining a sequence of messages corresponding to an application in accordance with this invention.

FIGS. 5A-5B and 6A-6B illustrate example executions of the script of FIG. 4 in accordance with this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The present invention enables a user to design and edit an application's behavior in a graphic environment. The user can import and edit existing application files, or create new files entirely from scratch. The user can further write and insert logic scripts into the application file to model complex application-layer logic and behavior. After modeling an application, its performance can be predicted using one or more simulations, including discrete event, analytic, or other simulations.

Data Exchange Chart

Figure 1A:
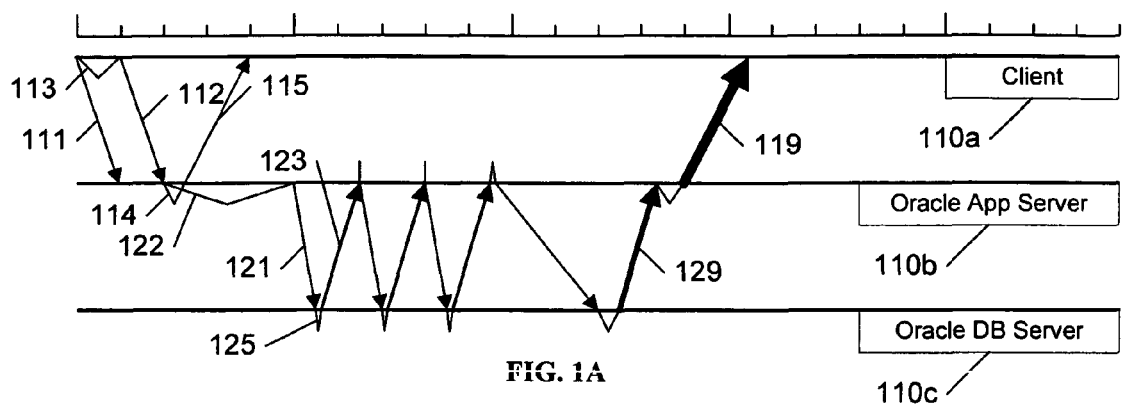
FIGS. 1A-1C illustrate an example sequence of changes to an example application-protocol-level graphic interface in accordance with this invention.

FIG. 1A illustrates an example graphic display of an exchange of data among three tiers in a sample network. As discussed further below, this display could have been created manually, or produced as an output of network simulation program that is configured to recognize application level relationships among packets, as taught, for example, in copending U.S. patent application Ser. No. 11/358,538, filed 21 Feb. 2006 for Malloy et al., and published as USPA 2006/0190231, which is incorporated by reference herein.

The example data exchange chart illustrated in FIG. 1A is one of several views that may be provided for assisting the user in modeling complex application-layer logic and behavior. Other views include a tier-pair circle and tree view (described below), which are preferably selectable as tabbed pages in a familiar notebook metaphor (see FIGS. 8A-8F). Users switch between views by simply selecting the corresponding tab.

The data exchange chart is useful for seeing the flow of messages across time. Messages and message groups can also be created here. The data exchange chart preferably uses colored arrows to represent application messages, and uses the color to indicate the amount of application-layer data in each message, or other attributes of the message. If messages are clustered too closely in time to be represented by individual arrows, the chart uses a solid bar (resembling those of a histogram) to represent the cluster of messages. A legend is preferably provided to show the color scheme used for visualizing the relative amount of tier processing delay and/or user think-time delay between two subsequent messages, the amount of application-layer data found in individual messages (for arrows), the relative amount of application data found in the messages of messages bands and message groups, and so on. It should be understood that in other embodiments, color could be used to represent a nearly limitless number of statistics.

Tiers

Creating a new tier is a relatively simple task. For example, the user can simply select an "insert tier" menu option and input an identifier into the resultant dialog box. Tiers can further be repositioned in the data exchange chart using well-know drag and drop operations. Other example tier operations include renaming and deleting.

Connections

Whenever two tiers exchange data, they can be collectively referred to as a tier pair. Furthermore, every tier pair comprises at least one connection. Users can create additional connections to model an application where two tiers exchange data using multiple connections. As an example, connections can be created from an "insert connection" option in a pull-down menu. The connection used by one or more messages can easily be modified by editing a "connection" message attribute of the message using a message editor, discussed further below. One connection of every tier pair is preferably designated as a default connection, so that when a new message is created, the "connection" attribute for that message is set to the default connection. The default connection can further be changed by the user as desired.

Messages

In a preferred embodiment, multiple ways of inserting messages between tier pairs are provided. One option is to use a mouse or other pointing device. In such an embodiment, the user begins by clicking within the data exchange chart and then selecting an "insert message" option from a pull-down menu. Next, the user moves the mouse pointer near a source tier for the message and clicks at a location representative of a desired start time. Lastly, the user moves the mouse pointer near the destination tier and clicks again. The tail of the message arrow is subsequently placed at the approximate location indicated by the cursor on the source tier line, and the head of the message arrow is placed on the destination tier line at an offset time from the tail of the message arrow. The offset time is a default time that is assigned by the system based on whatever information it may have regarding the source and destination nodes, such as an average propagation time between the tiers, given the size of the message.

A second option for inserting messages utilizes both the mouse and the keyboard and is referred to as "rapid message creation". The user begins by reviewing a rapid message creation submenu to identify the keyboard shortcuts that correspond to each tier in the data exchange chart. In a preferred embodiment, the keyboard shortcuts are assigned to Ctrl+<a number [0-9], wherein each tier is assigned a number>. To create a message, the user first clicks on a location in the data exchange chart representative of the start time of the message. Next, the user inputs the keyboard shortcut for the desired source tier. Finally, the user inputs the keyboard shortcut for the desired destination tier. The user can then continue to add messages in an efficient manner by simply entering the appropriate keyboard shortcuts.

When viewing or editing messages in the data exchange chart, the user can "lock out" irrelevant messages. Locked messages appear dimmed in the data exchange chart window, and cannot be selected or edited. This means that only messages in the connection, tier, or subtask of interest will appear in the message editor. Users can lock and unlock messages based on tier pair, subtask, and connection using operations in the preferred "Unlock" submenus.

Message Groups

Message groups are useful for modeling a well-defined series of requests and responses (for example, a series of chatty database requests). An "Insert Message Group" operation can preferably be used to create a group of sequential messages between two tiers. The attributes of a message group can be edited just as messages are edited via the message editor. A message group preferably appears as a solid bar in the data exchange chart; each group is split diagonally to show the average application payload per message in each direction (as specified, for example, in a legend associated with the data exchange chart page). For convenience, message groups model individual messages based on one or more of the following assumptions:

All messages are transferred between the same two tiers.
All messages sent from one tier are the same size. The message size is determined by the "Total application turns" and the "Total application bytes" specified for that tier.
The processing delay between messages at a tier is determined by the "Total application turns" and the "Total processing seconds" specified for that tier.
The total duration of a message group is determined by a specified network delay, the number of message turns, and the total processing time at each tier.

Dependencies

As the user adds messages to the data exchange chart, the system preferably automatically establishes the appropriate dependencies; however, the user is provided options for changing these dependencies. Changing the parent dependency of a message has two important effects: 1) since the new parent dependency will occur either earlier or later than the original dependency, the start time of the edited message and of all the messages that depend on that message will also occur earlier or later; and 2) changing the parent dependency of a message can affect the overall behavior of the application because the chain of parent/child message dependencies has changed as a result. In the preferred embodiment, a user can easily change a dependency using one of three methods: 1) by editing the corresponding message's attributes; 2) by dragging the dependency to a new parent in the data exchange chart; or 3) by right-clicking on the dependency connector and selecting a "Change Parent Dependency" option from the pop-up menu.

Message Editor

To this point, several references have been made to message attributes. The attributes of one or more selected messages can be viewed in the message editor, which is a window that is preferably displayed as part of the primary notebook page, but separated from the main view by a splitter. Each notebook page, i.e. the data exchange chart, the tier-pair circle, and the tree view, preferably maintain a separate message editor that changes with the selection of the corresponding tab.

The main purpose of the message editor is to provide a tabular interface for editing the attributes of messages in the data exchange chart. For example, instead of prompting the user for application delay/message size parameters for each newly added message, users are able to quickly add messages with reasonable defaults and then edit specific values after the fact. The list of messages in the message editor reflects the current selection set in the view in the upper portion of the tabbed notebook page.

The message editor preferably displays the following attributes for each message:

| Attribute | Description |
| --- | --- |
| ID | Message ID |
| Source | Source tier of the selected message |
| Destination | Destination tier of the selected message |
| Bytes | Message size, in bytes |
| Tag | Optional field, provided for extra flexibility when writing logic scripts. For example, a user can specify a tag for specific messages and then write a logic script that uses these tags to access the messages during simulation. |
| Subtask | Parent subtask of the message. The message can be moved to another subtask by changing this attribute. |
| Connection | Parent connection of the message. The message can be moved to another connection by changing this attribute. |
| Depends On | The parent dependency of the message. |
| Processing Time | Application processing time (in seconds) at the source tier between the previous (parent) event and the message start. |
| User Time | User "think time" (in seconds) at the source tier between the previous (parent) event the message start. The total delay between the previous event and the start of the current message is the sum of the Processing Time and the User Time attributes. |

TierPair Circle

The tier-pair circle is an alternate view for helping the user to design and edit an application's behavior. The tier-pair circle is useful for visualizing all tier-pair conversations in the application task, and to see which tiers are conversing and not conversing. The tier-pair circle presents the user with a graphical representation of static values between tier pairs. In addition to seeing a high-level overview of the application definition, users can effect the arrangement of the data exchange chart by selecting items in the circle view.

The circle view preferably comprises a tier listing, a center domain, a right-hand legend, a "show statistic" dropdown, and a statistic description text field. The tier listing is flat collection of tree nodes (no hierarchy) where each tree node represents a tier in the application definition. Each tree node has an icon next to the tier name. The center domain can be shown in either "circle" or "layout" mode and the positions of the domain elements can be automatically readjusted by running the "layout" algorithm.

The right-hand legend of this view contains a dynamic legend of the different color buckets used in the center domain. The buckets are calculated based on the range of values present for the current statistic. The statistic description text field displays a short description of the currently selected statistic.

By default, selecting items in the circle view affects the tier order in the data exchange chart. For example, selecting a relation brings the two tiers involved to the top of the corresponding data exchange chart. Selecting a tier pops that tier to the top. Preferably, there is also an option to turn this behavior off.

Tree View

A third application modeling view is the tree view. The tree view page is useful for visualizing and editing the way messages are organized by tier-pair, connection, or subtask. The tree view tab consists of a three-pane Gantt chart. This Gantt chart is intended to provide a high-level overview of the current application definition. The left-most pane is a tree that contains a hierarchical ordering of the elements in the application definition. Users can group the hierarchy in various ways by changing the "View by" dropdown list. Messages can be arranged in the treeview pane by tier pairs/connections or by subtasks.

The center pane of the Gantt chart consists of a table, where each column heading is a separate statistic and the row heading refers to the element in the hierarchy in the left-most pane. The statistics in the Gantt chart table change depending on the "view by" preference. Users can select the packet(s) of interest in the Gantt chart and modify their properties in the message editor.

The third pane of the Gantt chart is a visual representation of what the particular tree element looks like if it were to appear in the data exchange chart. The chart uses a solid bar (resembling those of a histogram) to represent clusters of messages. It utilizes the same coloring scheme as the data exchange chart. Different colors aid in visualizing the relative amount of tier processing delay and user think-time delay between two subsequent messages, the amount of application-layer data found in individual messages (for arrows), and the relative amount of application data found in the messages of messages bands and message groups.

Example Embodiments

In FIG. 1A, the three example tiers include a client 110a, an application server 110b, and a database server 110c, and illustrate a series of exchanges, such as might occur when a client 110a requests information from a database 110c, via commands sent to a server 110b. The client 110a initiates the transaction via a series of messages 111, 112 to the server 110b. In response to these messages 111, 112, the server 110b sends a message 115 to the client 110a, acknowledging receipt of the messages 111, 112, and also sends a message 121 to the database server 110c, requesting the data corresponding to the request from the client 110a. Thereafter, the database server 110c exchanges a number of messages 123-129 to effect the data transfer. The application server 110b packages the received data and communicates it to the client 110a via one or more messages 119.

The illustrated messages 111-129 may have been extracted from a simulation of a network that includes a plurality of nodes, in addition to the nodes corresponding to the client 110a, application server 110b, and database server 110d. As taught in the above referenced copending application, the preferred simulator is configured to allow a user to identify target applications, and each communicated packet that includes at least a portion of the messages associated with a target application is tagged for application-level reporting and analysis. That is, each packet that relates to a given application can be extracted from among the myriad assortment of packets that are simulated. Additionally, the flow of packets corresponding to an application is tracked, by noting the dependency of each message on prior messages. Every message in an application task (except the first message) depends on the arrival of a previous message. The first message is called the parent dependency of the second. Dependencies are illustrated in FIG. 1A as "V" shaped connectors 113, 114, 122, 125, and so on. That is, for example, dependencies 114 and 122 indicate that messages 115 and 121 are dependent upon the arrival of message 112 at the server 110b, from the client 110a. The length of 'delay' between the arrival of the message 112 and the transmission of each message 115 and 121 is dependent upon the processing required to generate the messages 115, 121, as well as any estimated "user-think-time" before the message is generated.

In the figures, the size of each message is indicated by the width of the arrow representing the message; preferably, as discussed above, color may alternatively be used to distinguish message sizes. The time required to effect the transfer of the message from tier to tier is indicated by starting the message arrow at the time that the message was ready for transmission from the source tier and ending the arrow at the message time that the last bit of the message is projected to be received at the destination tier. This time is typically termed the link traversal time, and includes a number of components:

Latency or Propagation time: the shortest time required for a bit of the message to travel from the source to the destination, generally determined by the distance between the source and destination, and the speed of light/electromagnetic propagation.

Bandwidth or Transit time: the shortest time required to transmit all of the bits of the message, generally determined by the bandwidth of the channel and the number of bits in the message.

Congestion or Link Protocol time: the time required to gain access to the channel to effect the transmission, generally determined by the difference between the time that the message was ready for transmission and the time that it was actually transmitted, including retransmissions.

Note that the latency and bandwidth times can be determined based on the distance between the nodes and the number of bits that are to be transmitted, but the congestion delay time is generally determined by simulation or other estimation techniques based on network loading and other factors.

Figure 1B:
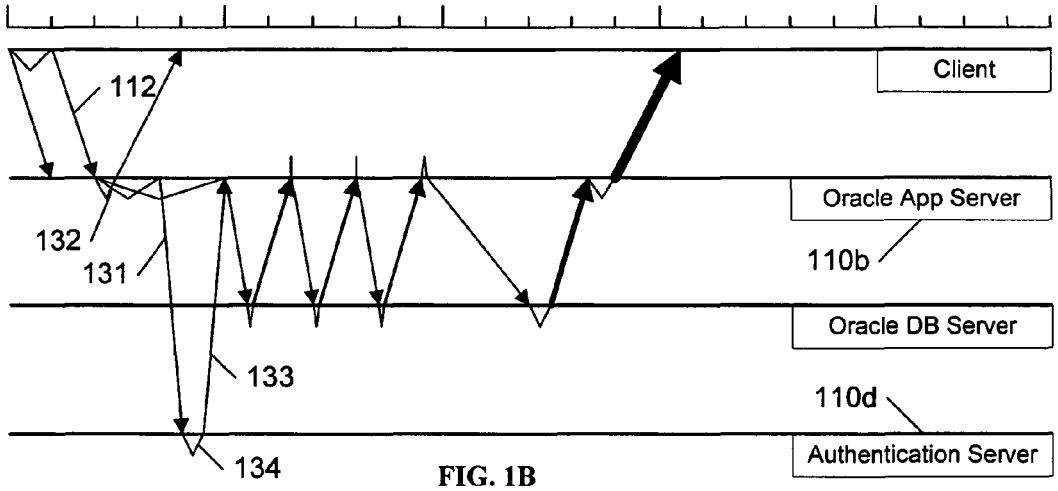

FIG. 1B illustrates a graphical edit of the data exchange chart of FIG. 1A, corresponding, for example, to an application developer's modifying the illustrated application to include an authentication check before the data from the database server 110c is requested by the application server 110b. FIG. 1B illustrates the addition of a new tier 110d and messages 131, 133. These modifications are preferably effected via the use of some of the operations described above, including, for example, "insert tier" and "insert message". In this example, the user adds a tier 110d and provides an identifier of "Authentication Server" to this tier. The identifier is preferably selected from a list of defined nodes in the network, although the user is free to add new identifiers or modify existing identifiers.

Figure 1C:
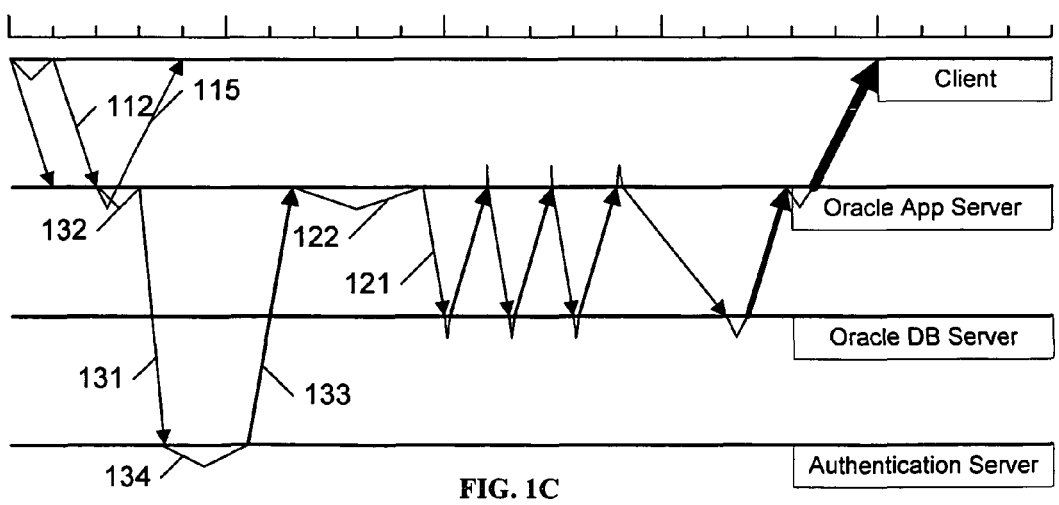

FIG. 1C illustrates the integration of the added sequence of messages 131, 133 to the existing sequence of FIG. 1A as well as other customizations of this sequence. Using the "Change Parent Dependency" feature described above, the user indicates that message 121 is dependent upon newly added message 133, and no longer directly dependent upon message 112.

As discussed above, the user can modify the attributes of the newly added sequence (or any other message or sequence) to better reflect the expected message flow. In this example, the tier processing time for message 131 is increased as evidenced by the larger gap between messages 131 and 133. Additionally, the size (bytes) of authentication message 133 is increased from the default value, resulting in a thicker line, and a longer link traversal time (reduced slope).

As noted above, the determination of the link traversal time includes deterministic factors, such as the bandwidth and latency related delays, as well as stochastic factors such as congestion delay, which are generally estimated based on statistical modeling or simulation. Preferably, the user provides information such as the message size, and, if a previously unknown tier is added, the location of the tier or an estimate of the distance to that tier. Other factors, such as the tier processing time, are preferably obtained from the models of the nodes used in the simulation tool, or user-determined estimates can be manually entered.

In a preferred embodiment, the link traversal is initially determined based on the deterministic factors, and subsequently re-determined based on simulations that provide varying degrees of precision. For example, an analytic simulation can be performed to provide a more detailed assessment of the timing characteristics of the application as run on the modeled system, optionally followed by a mixed-mode simulation, and then by a discrete-event simulation, as more detailed assessments are required. As the simulations are performed, the data exchange chart is correspondingly updated to reflect the changes in timing characteristics.

FIG. 2 illustrates a block diagram of an example application level design and analysis system in accordance with aspects of this invention. One or more simulators 210 are configured to simulate a model of a network within which a target application is executed. To provide realistic estimates of performance, the application is simulated in a modeled environment that includes a variety of other applications and/or traffic patterns. An application extractor 220 extracts the messages or other parameters that are specific to the application of interest from amongst the other simulated traffic, and displays this application-specific information on a display 230.

As detailed above, in a preferred embodiment, a user interface 240 allows a user to interact with the variety of display formats to modify the traffic patterns or parameters corresponding to the application of interest, the data exchange chart typically being the form that is most convenient for adding message sequences and the like. After creating or modifying the traffic patterns or parameters, the input processor 250 provides the modified information to the one or more simulators 210 for simulation and subsequent analysis, as discussed above.

As an alternative to modifying an existing exchange of messages, one of ordinary skill in the art will recognize that the user interface 240 and logic scripts 260 may be used to create a sequence of message exchanges of an application completely from scratch, to initiate an iterative development and analysis process.

Scripting

In addition to providing a graphic interface to define message exchanges, or to modify timing parameters and traffic characteristics, a preferred embodiment of this invention allows a user to define one or more 'logic scripts' 260 corresponding to select operations. These logic scripts are preferably written is a general purpose programming language, so that any of a variety of operations may be defined to be performed. In a preferred embodiment, the "Python" programming language is used, and a library of functions are predefined to facilitate the use of this language for describing application level functions for execution on a network simulator. This library includes, for example, functions for generating sequences of messages, based on user-defined parameters; launching sub-tasks, including conditional launches based on results of prior tasks; defining delays, including within-task delays, such as processing delays, as well as user 'think time' delays; conditional branching and looping; and so on. A variety of additional scripting features are described below.

Variables, Helper Functions, and Header Blocks

When a user declares a variable within a logic script, the variable is local to that script. Global variables can also be defined, which are available to all scripts. Another scripting feature includes helper functions, which can be defined in a special function block. Functions declared in this block can then be called by any logic script. Lastly, a header block can be used to import Python libraries and to specify global definitions.

Parameters

A parameter describes a task property. Parameters make a task configurable, because they can be set by a user before simulation. In a task-chaining scenario, a parent task can also set parameters for a child task before running it. To declare new parameters, a user can preferably choose a "declare parameters" option from a pull-down menu. The user can then specify a parameter name, type, default value, and description in a resultant dialog box. Unlike variables or external attributes, parameters cannot be changed after a task starts running. A variety of options for setting a parameter before the task runs, including the following:

1) Set the default value—Every parameter has a default value. The value for each parameter can be specified manually in the declare parameters dialog box.

2) Discrete event simulations—there preferably exists a task definition configuration object that lists the application parameters of the underlying task. A parameters attribute contained within this object can be manually edited.

3) Launching a child task—An invoke_child_task( ) method includes a task_params argument, so a parent task can set application parameters in a child task before launching it.

Task Chaining

The invoke_child_task( ) method mentioned immediately above can be used to create a "task chain" in which a parent task calls one or more child tasks. Task chaining is useful for modeling applications that span multiple tiers and consist of multiple tasks.

Consider a task chaining example comprising two tiers, client and web_services. A parent task has an application parameter called request_type. Depending on the value of this parameter, the logic script at the web_services tier calls either of two child tasks. The result is a dynamic web-services task with three tiers, in which the parent task models the client-side traffic and the child task models the back-end traffic.

The user can further specify that a child task be launched in blocking or non-blocking mode. When a parent launches a child in blocking mode, execution of the parent task is blocked until the child task finishes. When a parent launches a child in non-blocking mode, the parent resumes execution after launching the child and the two tasks run at the same time. The end of a child task, however, can be difficult to determine in advance. To identify the end of a child task to its parent task, a final response message is preferably implemented. This is a designated message created by the child task (though not necessarily the last one sent). Receipt of the final response message triggers notification to the parent task that the child task is complete (if such notification was requested by registering a completion callback function from the invoke_child_task( ) method). The final response message has no effect on the child task, which might continue executing. The final response message simply provides feedback to the parent task about the progress of the child task, allowing the parent task to resume execution. Each child task has a designated final response message. This message is chosen automatically using simple network estimation to identify the last message to complete. Logic scripts can set a different final response message while a child task is executing. Preferably, a set_final_response( ) method is used to designate any message of the child task as the final response, or to clear the designation so that there is no final response.

Callback Infrastructure

The Python application program interface (API) includes a callback infrastructure that allows users to set callback functions for particular events. For example, "register_receipt_callback" and "register_timeout_callback" are two types of callback functions. The first registers a function to be called when a specific message is received. The second registers a function to be called if a specific message is not received within a certain amount of time.

States

Physical nodes within a discrete event simulation can be assigned user-defined states. Accordingly, users can write python code that sets some state (ie: size of a message, number of outstanding requests, etc) on a node (ie: a particular web server, etc). The python code then can access that state later. For example, one simulation could queue messages on a load balancer while a separate simulation processes any incoming requests in the queue. The Python API includes two functions, set_state and get_state, for setting and accessing node states.

Scripting Examples

FIGS. 3A-3C illustrate an example use of a logic script to parameterize a message in an application. In this example, consider that the message exchange of FIGS. 1A-1C corresponds to a database request for employee records. An application developer will typically be interested in determining how well the application performs under a variety of scenarios, including performance as a function of the number of employee records being retrieved. In this example, the application developer introduces a parameter "num_employees" that indicates the number of employees, and desires to use this parameter to vary the size ("response_msg_size") of the response 129 from the database server 110c to the application server 110b. Next, the developer selects the message 129, and the message editor 310 displays the message attributes 129' corresponding to the selected message 129. The attributes 129' include the identifier ("ID") 311 of the message 129, and a representation of the identifier 311' is added to the display (FIG. 3A) of the message 129, for ease of reference. The developer modifies the tag attribute 312 to read "db_response". This tag will be used to refer to the message in a logic script (312' in FIG. 3C).

A logic script 320' can be inserted in the data exchange chart by right-clicking on the desired message or dependency and choosing either the "add logic script at start" option or the "add logic script at end" option from the resultant pop-up menu. In this example, the user has right-clicked on the dependency 128 and chosen the "add logic script at end" option. A script symbol 320 is automatically added to the display and a script editor box is opened (FIG. 3C) to enable the user to create the script 320'.

The first line of the example logic script 320' defines the local variable "num_employees" 321 as being assigned the value of the 'num_employees' parameter mentioned above. The second line in the script identifies the message that is to be modified as "response_msg" 322 and assigns it the value 312' of the aforementioned message tag 'db_response' 312 of message 129. The third line of the script 320' defines the size 323 of this message 322 to be equal to the value 321' of the local variable "num_employees" 321 multiplied by 2000 (bytes).

After creating the script, the user saves it and closes the script editor box. In order to see how the application will perform using the modified scenario, the user executes a simulation. As the script 320' is executed by the simulator prior to the start of message 129, the size of the message 129 is set equal to the number of employees specified by the 'num_employees' parameter multiplied by 2000 bytes. The user can then review the results of the simulation, and if he or she so chooses, modify the "num_employeers" parameter and immediately rerun the simulation to compare the change in performance.

Although the invention has been presented thus far using the paradigm of modifying an existing exchange of messages, one of ordinary skill in the art will recognize that the user interface 240 and logic scripts 260 may be used to create a sequence of message exchanges of an application, to initiate this iterative development and analysis process.

FIG. 4 illustrates an example logic script that generates a series of requests to retrieve a given number of rows of data from a database. In this example, the database server can be configured to return a given number of bytes from the database with each request, so as to potentially provide a 'prefetch' of bytes in anticipation of a follow-on request for immediately subsequent data in the database.

In this example, each row of data comprises 55 bytes, and upon receipt of each request, the database server is configured to return one or more rows of data, depending upon the value of a parameter 'prefetch_count'. That is, if the prefetch_count is one, a single row of 55 bytes is returned; if the prefetch_count is two, two rows of 55 bytes are returned with each request; and so on. Each response also includes a number of bytes of 'overhead', such as the header information contained in each message. In this example, the number of overhead bytes per message is 53. Other parameters used in this example include 95 bytes per request, and processing times of 0.15 ms per request, and 1.8 ms per response.

At 410 and 412, the user-definable parameters num_rows (the total number of rows to be read) and prefetch_count (the number of rows to read/return with each request) are read from the aforementioned parameters file.

At 420, the value of the response_overhead (53 bytes) is assigned, and at 422, the value of the number of bytes_per_row (55 bytes) is assigned. Based on these values, and the prefetch_count, the size of each response is calculated, at 424. As illustrated, the size of each request equals one response_overhead plus the number of bytes_per_row multiplied by the number of rows returned with each request (the prefetch_count).

At 430, the number of requests required (num_loops) is determined, based on the total number of rows to be read divided by the number of rows read with each request. The "ceil" function rounds the determined value up to the nearest integer value.

At 445-475, a repetitive loop is executed to generate each of the determined number of requests (num_loops) and corresponding responses. As discussed further below, each request is dependent upon receipt of a response to a prior request; at 440, the loop is initialized by asserting that a prior response message has occurred.

At 450, a request message (request_msg) is created, using the arguments of: size, source, destination, and dependency. The size 451 of each request message is given above as 95 bytes; the source 452 is the 'app_server'; the destination is the 'db_server'; and each request message is dependent 453 upon receipt of a response message (response_msg).

At 460, a response message (response_msg) is created. The size 461 of each response is contained in the variable response_size, determined above at 424; the source 462 of the response is the 'db_server', and the destination is the 'app_server'. Each response message is dependent 464 upon receipt of a request (request_msg).

The aforementioned tier processing times of 0.15 ms and 1.8 ms are incurred with each request-response sequence, and the data field 'cpu_time' of each request and response message is used to accumulate these processing times, at 470 and 471.

The script of FIG. 4 can be executed in a 'stand-alone' mode, as an independent task, or as part of a larger application, as a child-task. A child-task is added to a larger script as a subroutine or function call, preferably with control parameters that indicate whether the call is launched as an independent child-task, or as a sequentially-executed task within the larger script. An independent child-task is a non-blocking task, in that the higher level process continues independent of the completion of the child-task, whereas sequentially-executed child-tasks block an upper level task from continuing until the child-task is completed. A child-task is added to a data exchange chart by inserting a script into the message exchange sequence, as discussed above with regard to script symbol 320 in FIG. 3A, and as discussed further below with regard to FIG. 6A.

FIG. 5A illustrates the use of defined default values for script parameters, and FIG. 5B illustrates the results of executing the script of FIG. 4 using these default values.

When the user selects a 'declare parameters' option, a table such as illustrated in FIG. 5A is provided. The parameters num_rows and prefetch_count are used in the script of FIG. 4, and are defined in the table of FIG. 5A as having default values of 500 and 1, respectively. That is, unless otherwise directed, an execution of the model comprising the script of FIG. 4 will result in the simulation of requesting and receiving 500 rows of data (num_rows), each request resulting in receipt of one row (prefetch_count).

FIG. 5B illustrates an example output of a simulation of the logic script of FIG. 4. As noted above, the simulators of this invention are configured to provide a variety of output formats. A data exchange chart output of the simulator, such as used in FIGS. 1A-1C would produce a repetition of 500 requests and responses between the app_server and the db_server. The alternative format of FIG. 5B provides a bar chart that illustrates the accumulated delays incurred during the communication of these 500 requests and responses, to facilitate a high-level analysis of the performance of this application, or segment of an application.

In this example, the link between the app_server and the db_server is specified as having a bandwidth in each direction of 10 Mbps, and a latency of 1 ms. That is, each bit of a message will arrive at the destination one millisecond after it is transmitted from the source, and the source can transmit up to ten million bits each second.

Given that 500 requests and 500 responses must be communicated, and each request consumes 0.15 ms of processing time and each response requires 1.8 ms of processing time, the total tier processing time is determined to be 975 milliseconds ((500*0.15 ms)+(500*1.8 ms)). The first segment 510 of the bar chart of FIG. 5B illustrates this portion of the overall delay.

Each request is specified as having 95 bytes, and each response includes 108 bytes (53 bytes of overhead plus 55 bytes per row times one row per request); therefore, the 500 requests and responses will result in 101500 bytes being communicated. With a bandwidth of 10 Mbps (approximately 1 mega-byte per second), the bandwidth delay amounts to about a tenth of a second, as illustrated by the second segment 520 of the bar chart of FIG. 5B.

The distance between the source and destination causes a 1 ms latency delay, and therefore the 500 requests and 500 responses produce a second of accumulated latency ((500*1 ms)+(500*1 ms)), as illustrated by the third segment 530 of the bar chart of FIG. 5B.

In this example, no other traffic was simulated, and therefore the congestion delay is not determined. This example would correspond, for example, to an initial analytic simulation that an application developer would use to identify the delays inherent in the application, assuming no interference from other applications. If this model were run in a simulation that included other network traffic, the congestion/protocol delay would be included in the bar chart, while the illustrated other components of delay 510, 520, and 530 would remain the same.

As noted above, the application model containing the logic script of FIG. 4 may be used as a child-task script, and FIG. 6A illustrates an example script that can be used to launch this child-task. This script would be added to a data exchange chart in the same manner that script 320' of FIG. 3C was added to the data exchange chart of FIG. 3A.

The first line of the script of FIG. 6A illustrates a technique for assigning values to parameters of a child-task. When the child-task is executed, the currently assigned values are used in lieu of the default values, thereby allowing a developer to easily simulate multiple occurrences of the same script and/or individual occurrences of the script with different parameter values. In this example, the script of FIG. 4 will be executed with a value of 1000 as the number of rows to be read (num_rows), and the value of 10 as the number of rows to read per request (prefetch_count).

The second line of the script of FIG. 6A effects the execution of the script of FIG. 4, assuming that the script is entitled "db_access_with_prefetch". The invoke_child_task function utilizes the following arguments:

| Argument | Type | Description |
|---|---|---|
| parent_action | Action | Parent of the Current Action |
| task_name | String | Name of the task to call |
| is_blocking | Boolean | Whether the child task should be blocking (True) or not (False) |
| task_params | Dictionary | Set of changes to parameters of the child task |
| tier_map | Dictionary | Mapping of the child task tiers to parent task tiers |
| task_completion_function | Bound method object | Python function to be called upon completion of the child task |
| task_completion_data | Tuple | Arguments to the callback function |

Because ten rows are read with each request, the reading of 1000 rows only requires 100 requests and 100 corresponding responses. Thus, even though this example illustrates reading twice as many rows as the example of FIGS. 5A-B, the tier processing time is reduced from 975 ms in FIG. 5B to 195 ms ((100*0.15 ms)+(100*1.8 ms)) in FIG. 6B. In like manner, the latency delay amounts to only 200 ms ((100*1 ms)+(100*1 ms)) in FIG. 6B, as compared to a full second in FIG. 5B. The bandwidth delay does not change substantially, because twice the amount of data (1000 rows in FIGS. 6A-B, compared to 500 rows in FIGS. 5A-5B) is communicated, and the total number of bytes transmitted amounts to 69800 bytes ((100*95)+(100*(53+10*55))), which incurs about 0.07 ms of bandwidth delay in a 10 Mbps channel.

As is evident in the above examples, the use of logic scripts substantially reduces the effort required to generate long or complex sequences of application-related messages, as well as providing an easy mechanism for evaluating alternative application-level decisions related to network based systems, including the tradeoffs associated with caching, prefetching, buffering, and so on.

In addition to providing programming capabilities for creating and modifying message sequences, a preferred embodiment of this invention includes advanced editing tools that facilitate the selection of messages, the editing of characteristic parameters associated with groups of messages, and so on. For example, in lieu of changing parameters via a logic script, a logical grouping of messages can be formed, using either graphic selection tools, or text-based tools, such as sorting tools and others. Once a group is formed, parameter values, such as the size, source, destination, delays, dependencies, and so on, can be assigned or modified for all of the messages in the group. Group parameters may also be modified using scripts. In a preferred embodiment, message hierarchies are supported for organizing tiers and messages, and tools are provided to edit and view the messages by tiers, connections, subtasks, and so on.

Figure 7A:
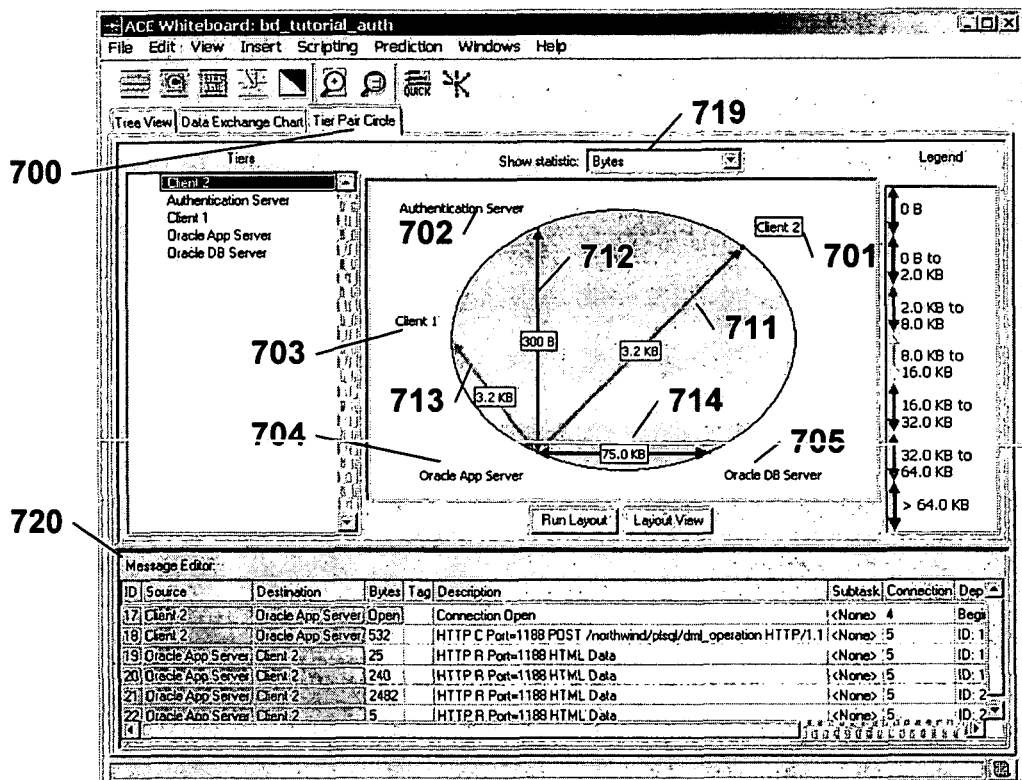
FIGS. 7A-7B, 8A-8F, 9, and 10 illustrate example screen shots of a user interface for creating and modifying messages in accordance with this invention.
Figure 7B:
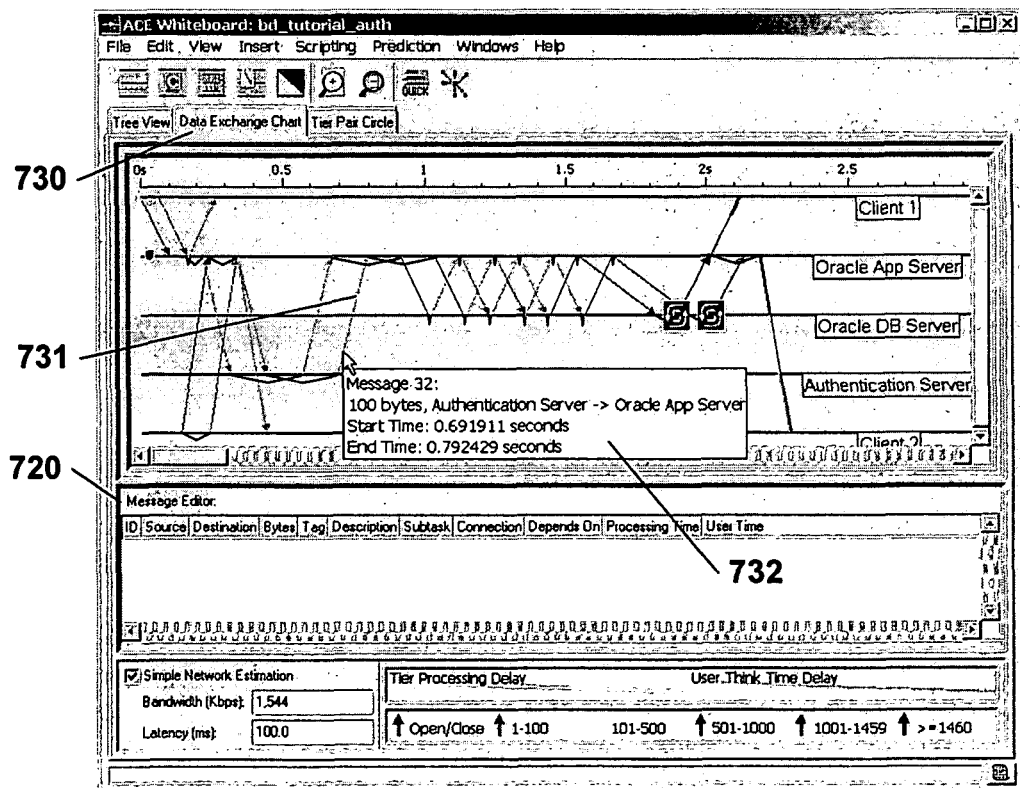

FIGS. 7A-7C further illustrate the user interface that facilitates the selection, creation, and editing of messages in accordance with this invention.

FIG. 7A illustrates an example of the aforementioned "Tier Pair Circle" notebook page 700, wherein each tier 701 . . . 705 is illustrated as a point on the circumference of a circle/oval 710, and each arrow 711 . . . 714 between the points indicates a summary statistic related to the messages exchanged between the tiers. In this example, the selected summary statistic 719 is the number of bytes, which is indicated by the color of each arrow as well as by a text box on the arrow. Other selectable statistics include, for example, the number of exchanged packets, the cumulative delay of the messages, and the duration of the exchange.

In the example of FIG. 7A, the user has selected the "client 2" tier, and the message editor 720 displays all of the messages sent or received by this tier. Alternatively, the user could select the arrow/link between tiers, and the messages communicated over that link would be displayed. In this manner, a user can quickly select the messages associated with a tier, link, connection, or subtask of interest, to either view the details or to modify one or more of these messages.

FIG. 7B illustrates the "Data Exchange Chart" notebook page 730 for the same application, and the details of the exchanges between the tiers are displayed in this example, the user has placed the cursor over one of the message arrows 731, and the details related to the message are displayed in a pop-up information box 732. If the user selects the message, further details will be displayed in the message editor 720, thereby allowing the user to view and/or modify each of the parameters of the selected message. The user may select multiple messages for display in the message editor 720, either by clicking on each message, or by group selection, using the conventional click and drag technique for defining a selection rectangle.

FIGS. 8A-8E illustrate additional examples of the user interface that facilitates the selection, creation, and editing of messages in accordance with this invention.

Figure 8A:
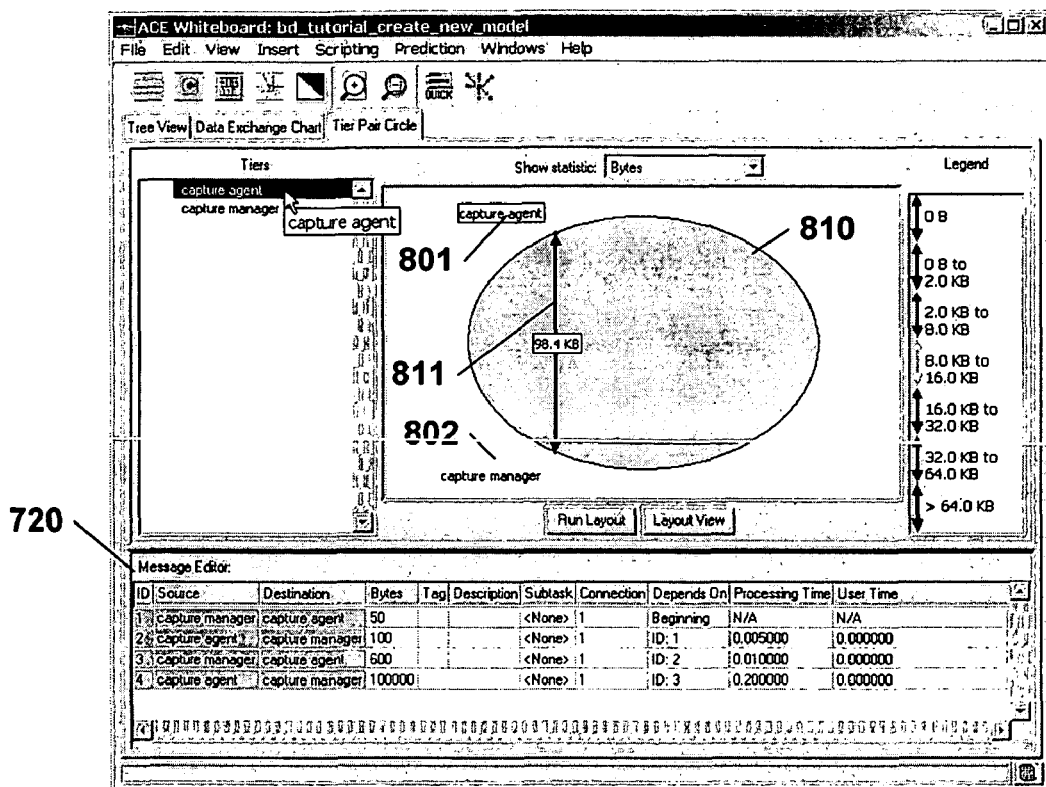

FIG. 8A illustrates the initial creation of a tier pair and a message sequence. In this example, the user has entered the names of two tiers, "capture agent" and "capture manager", and a sequence of four messages between these tiers. Any of a variety of techniques could have been used to enter this information, including for example, using any of the previously disclosed tier and message creation and editing methods. After the tiers and messages are created, the tier-pair circle 810 is automatically created, with the tiers 801, 802 and link 811 corresponding to the input information.

Figure 8B:
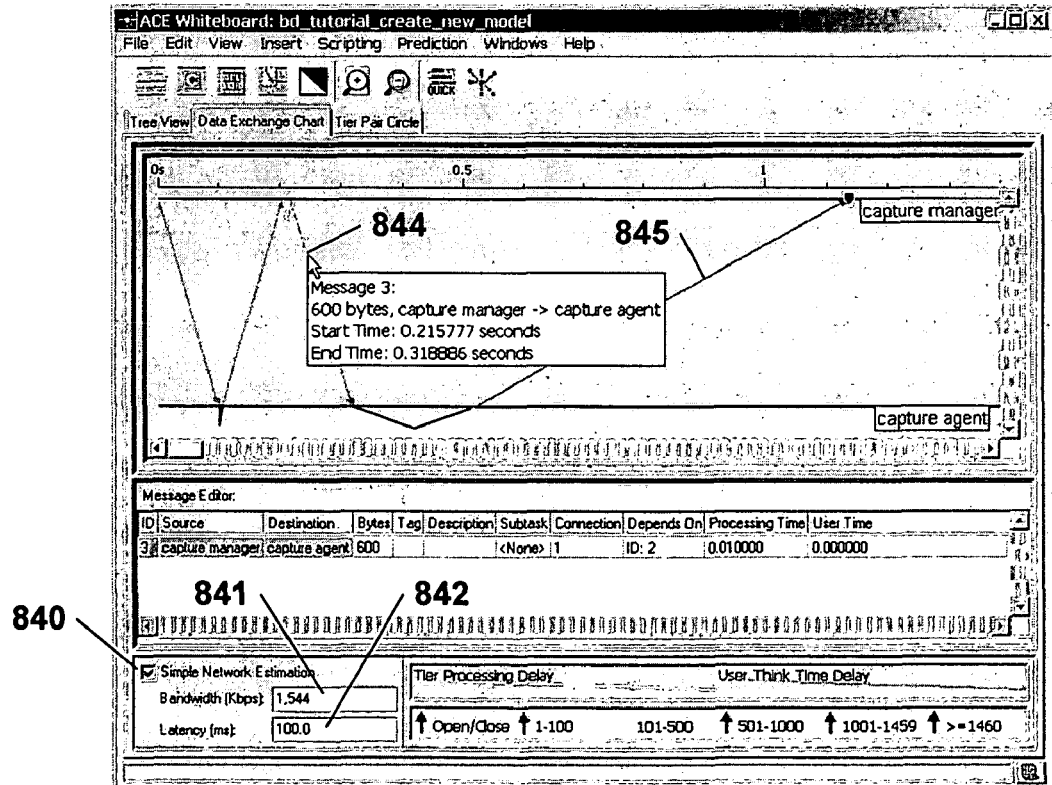
Figure 8C:
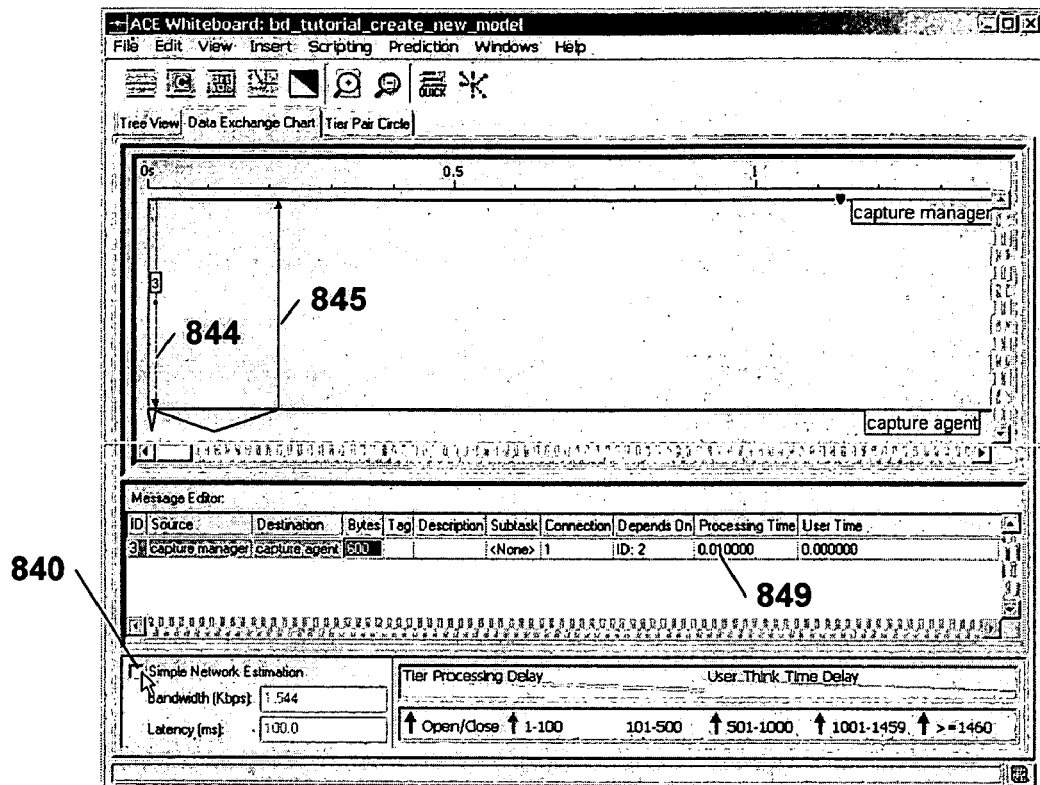

FIGS. 8B and 8C illustrate the corresponding data exchange chart views of the input information, with and without the selection of the online "Simple Network Estimation" simulator. As discussed above, various levels of simulation detail are preferably provided, ranging for example, from discrete event simulation to simple modeling of bandwidth and latency delays. In FIG. 8B, the "Simple Network Estimation" box 840 is checked, which causes an "on-line" bandwidth and latency simulation to occur while the user is interacting with the user interface, using the specified bandwidth and latency parameters 841 and 842. If the on-line simulation is enabled, as each message is added, the system automatically estimates the time that the message should arrive at the destination, and places the head of the message arrow at the corresponding point in time at the destination tier, resulting in a slanted arrow, such as illustrated as arrows 844 and 845. In FIG. 8C, the "Simple Network Estimation" box 840 is not checked, and the on-line simulation is not performed. As such, the system does not determine a bandwidth or latency delay, and the head of each arrow 844, 845 is placed at the destination tier at the same time point as on the source tier, resulting in vertical arrows 844, 845 in FIG. 8C. The processing time 849 associated with message 3 determines the distance between arrows 844 and 845, because message 4 is dependent upon message 3.

Figure 8D:
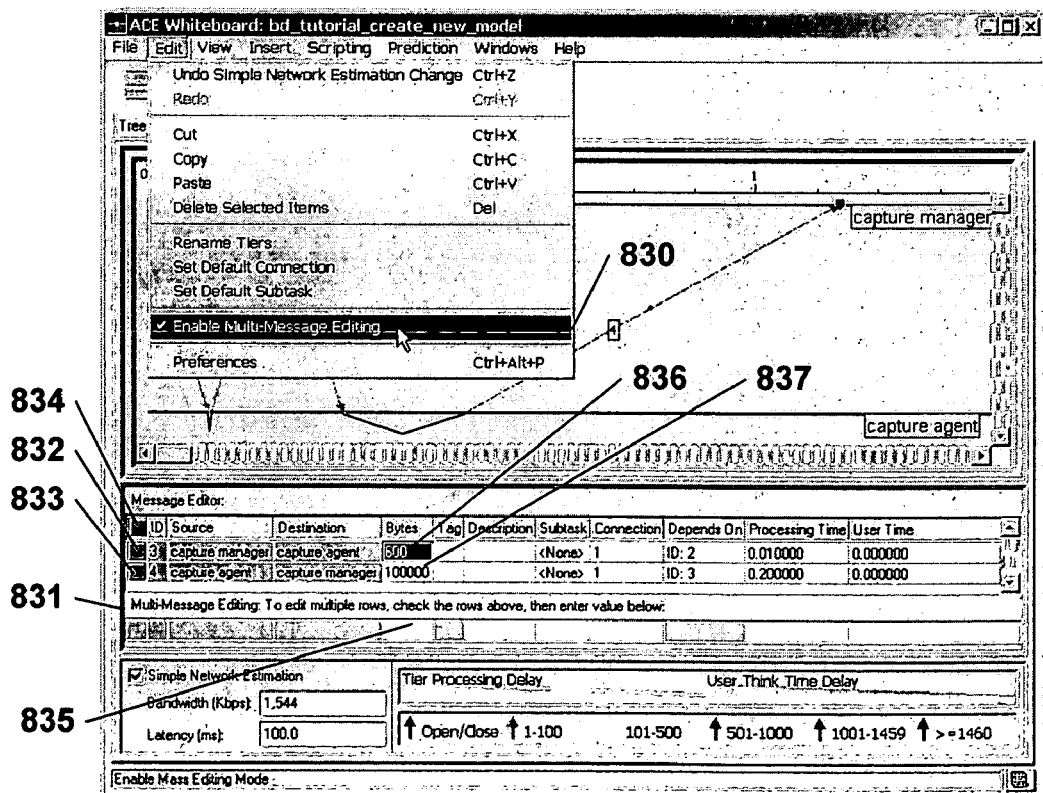

FIG. 8D illustrates the selection of a multiple-message editing option 830, which produces a multiple-message editing window 831 in the message editor. The selection of this option 830 also causes a selection button 832, 833 to be placed adjacent each of the messages in the message editor, and a 'select all/unselect all' button 834 to be placed at the top row of the message editor. When a user enters a value into an edit box 835 of the multiple-message editing window 831, that value is replicated to all of the messages that have been selected for multiple-message editing. For example, if both messages 3 and 4 are selected for multiple-message editing, via their corresponding selection buttons 832, 833, or via the select all button 834, and a user enter "12345" in the "bytes" column edit box 835, the corresponding entries 836, 837 in the "bytes" column of messages 3 and 4 will be changed to the value of "12345", and the data exchange chart will be updated to reflect this change to both messages.

Figure 8E:
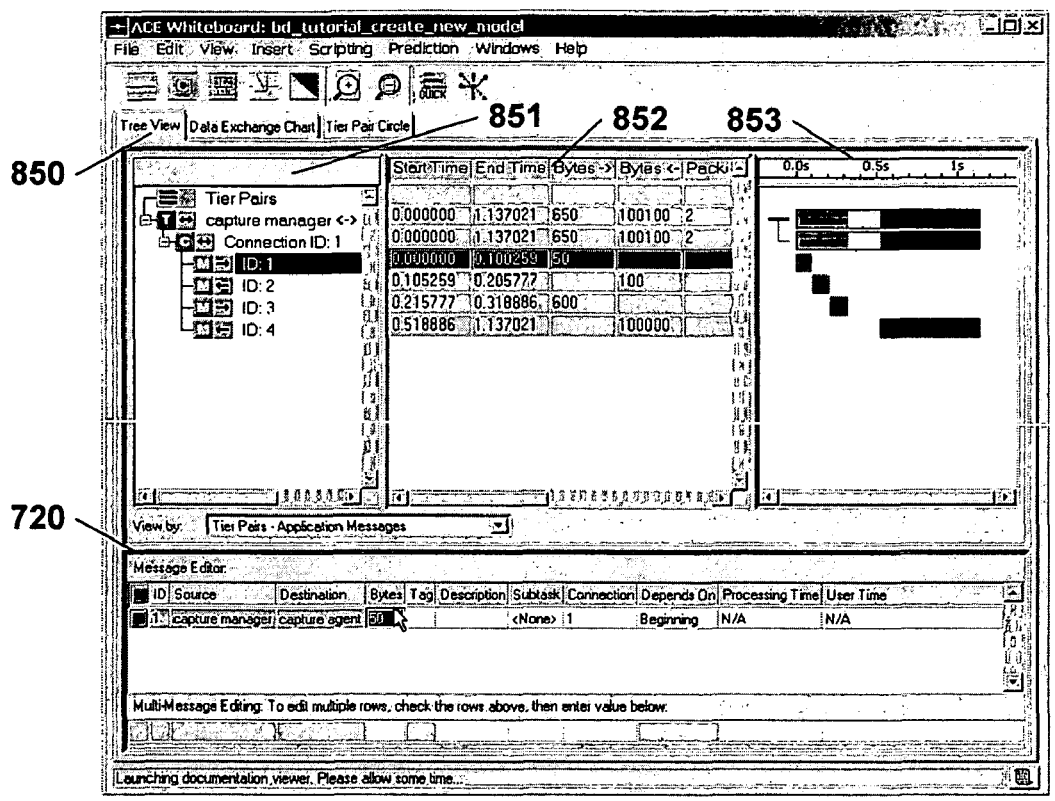
Figure 8F:
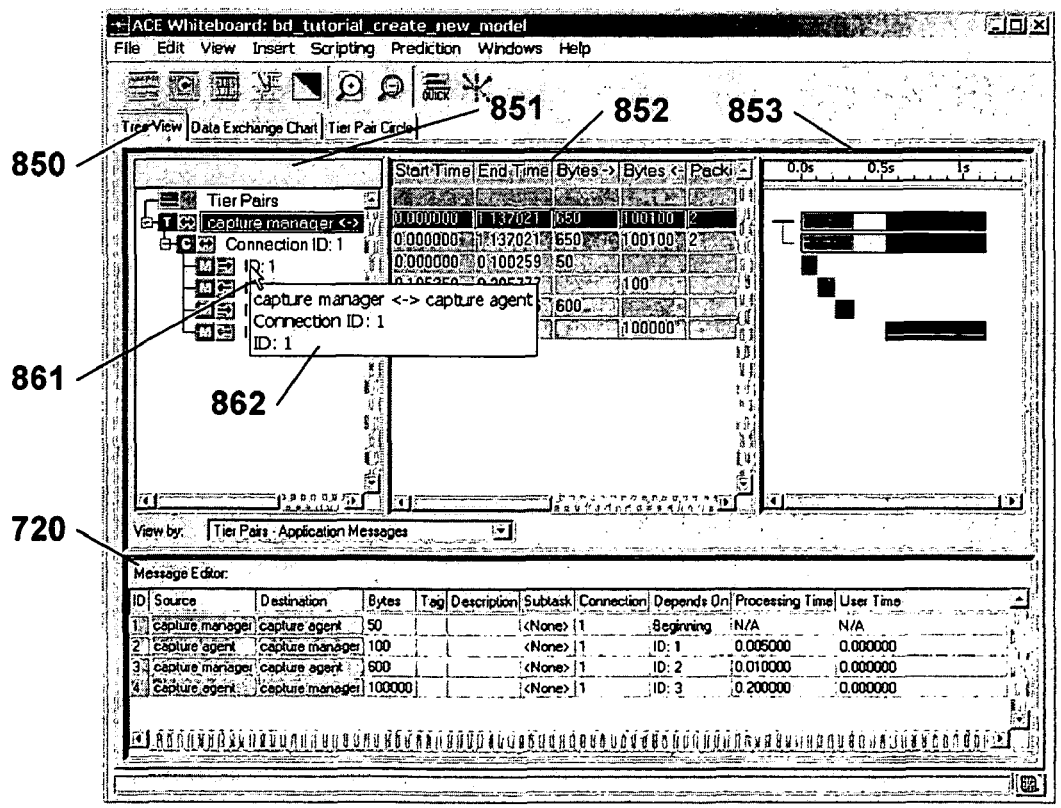

FIGS. 8E and 8F illustrate the "Tree View" notebook page 850. In this view, three row-synchronized panes 851, 852, 853 are provided. The pane 851 illustrates a hierarchy of messages, arranged by tier pairs. In this example, there is only one tier pair; but if there were others, they would each appear at the upper level of the hierarchy. The next level of the example hierarchy are the connections between each tier of the pair. In this example, there is only one connection linking the tier pair; but if there were others, they would each appear at this next level of the hierarchy. At the next level of the hierarchy, each of the messages that travel over each connection of each tier pair is displayed. As in conventional tree-displays, the user has the option of 'hiding' or 'revealing' the entries below each higher-level entry.

Pane 852 illustrates the details associated with each of the selectively displayed items in a tabular format in pane 851. The table preferably comprises at least the following information: Start Time, End Time, Bytes Sent, Bytes Received, Packets Sent, Packets Received, Tag, Description, Source, and Destination. Pane 853 presents the timing details in a Gantt-type graphic format. Note that the information at each level of the hierarchy encompasses the information of its lower members.

In the example of FIG. 8E, the first message (ID: 1) is selected in the pane 851, and the corresponding detailed information in pane 852 is highlighted. Additionally, the detailed information is placed in the message editor 720, for optional editing by the user. In the example of FIG. 8F, the entire tier pair is selected in pane 851, and the detailed information for all of the messages of this tier pair is placed in the message editor 720. Also illustrated in FIG. 8F is an information pop-up 860 that provides information related to each item as the cursor 861 is placed over the item.

Figure 9:
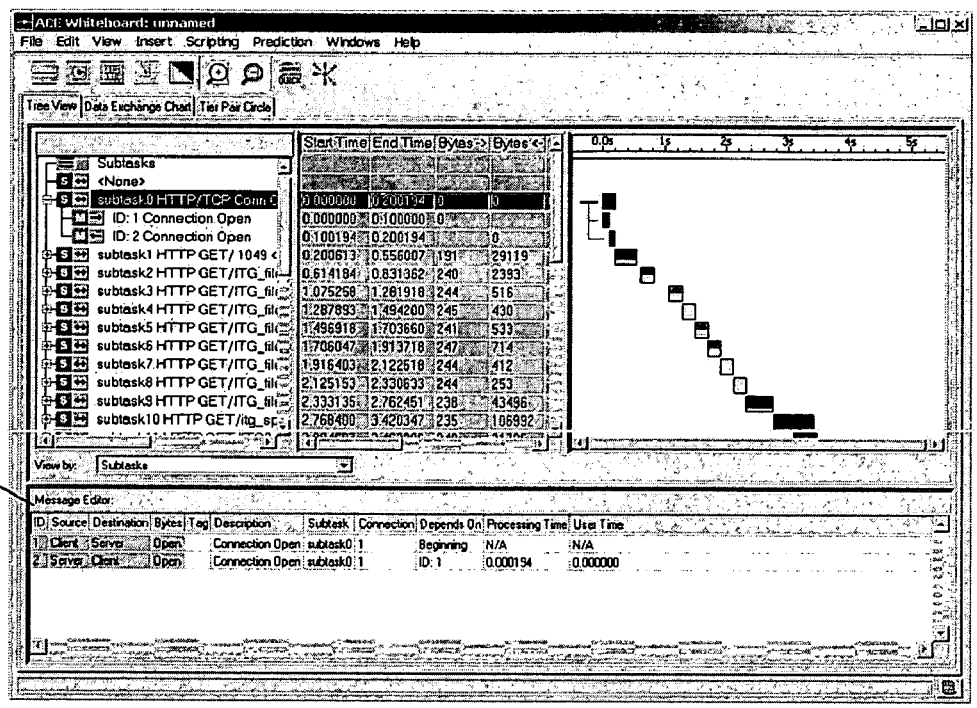

FIG. 9 illustrates another example of a tree view of messages, arranged by a different hierarchy, which in this case is a sub-task hierarchy. In a typical network, messages may be communicated from one tier to another via a series of intermediate communications, such as via a series of routers along a path from the source to the destination, using one or more packets to convey the message. A collection of messages corresponding to a particular operation (e.g. downloading a home page) is typically termed a "transaction", and in a default embodiment of this invention, each transaction may be defined as a sub-task. Optionally, a user may define a different formation of sub-tasks, such as a grouping of multiple transactions, a grouping of multiple messages, and so on.

Figure 10:
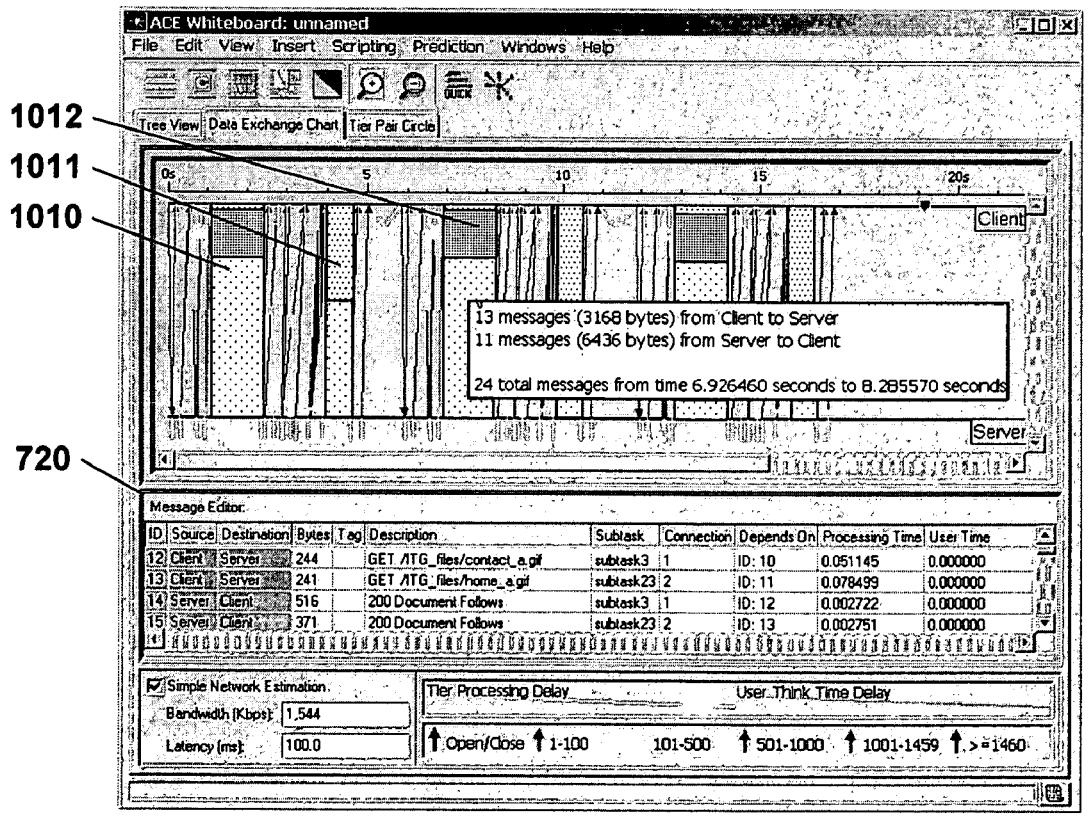

In the previous examples of a data exchange chart, each message is illustrated as a single arrow. As noted above, in many instances, the use of an arrow for each message is infeasible, particularly in "chatty" applications that involve many small exchanges in a short period of time. FIG. 10 illustrates an alternative display format that includes the use of rectangular blocks 1010, 1011, 1012 to represent multiple messages. As illustrated by the information box 1020, the block 1012 represents a total of 24 messages between the client and server tiers. The shading of the blocks 1010, 1011, 1012 indicate the cumulative delays in histogram form. Selection of a block results in the details of each message in the block being presented in the message editor 720, and a 'zoom in' to the block, by increasing the time resolution, results in the display of the individual message arrows.

One of ordinary skill in the art will recognize that a virtually limitless variety of viewing and selection options can be provided to facilitate the creation and modification of messages at the application-protocol layer, following the examples provided herein. As discussed above, by providing tools that facilitate viewing the timing characteristics associated with messages generated during the execution of an application from a variety of viewpoints, the user of the system and methods of this invention can quickly and easily assess how well an application will perform under a given set of conditions, and by providing tools that enable a user to interact using the same interface that provides the visualization, the user of the system and methods of this invention can quickly and easily create and assess alternative configurations and/or scenarios.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

We claim:

1. A method comprising:
simulating, on a simulation machine, a propagation of a plurality of messages corresponding to an application among nodes of a modeled network,
providing a graphic representation of the propagation of the plurality of messages,
providing a user interface to the graphic representation to facilitate receiving user-defined message operations, each message operation defining a source and a destination for one or more created messages,
receiving one or more of the user-defined message operations, and
resimulating, on the simulation machine, the propagation of the plurality of messages based on the one or more user-defined message operations,
wherein at least one of the user-defined message operations causes the simulation machine to generate a plurality of packets for propagation from the source to the destination during the resimulation.

2. The method of claim 1, wherein simulating the propagation of the messages includes at least one of:
determining an analytic steady-state condition of the network,
performing a discrete-event simulation of the network,
performing a mix of discrete-event simulation and analytic determination,
generating test messages on an embodiment of some or all of the modeled network.

3. The method of claim 1, wherein the graphic representation includes a data exchange chart that illustrates the propagation of the messages between tiers.

4. The method of claim 3, wherein the user interface includes a graphic interface that facilitates creation of additional messages on the data exchange chart.

5. The method of claim 3, wherein the user interface includes a graphic interface that facilitates modification of the messages on the data exchange chart.

6. The method of claim 1, including determining a delay associated with each message, and displaying each message on the graphic representation based on the delay.

7. The method of claim 1, including extracting the messages corresponding to the application from among a plurality of messages that includes other traffic on the network.

8. The method of claim 7, wherein extracting the messages is based on dependencies between messages.

9. The method of claim 1, wherein simulating the propagation of messages includes modeling the propagation at a transport-protocol layer.

10. A system comprising:
a user interface that is configured to facilitate a user's creation of a plurality of messages corresponding to an application via a graphic representation of propagation of the messages among tiers of a network, an input processor that is configured to process the plurality of messages to provide a model of traffic associated with the application, and a network simulator that is configured to simulate propagation of packets on a modeled network, based on the model of the traffic associated with the application;

wherein the user interface is configured to receive user input to facilitate the creation and manipulation of elements of the graphic representation, and the model of the traffic causes the network simulator to generate a plurality of the packets corresponding to at least one message of the plurality of messages.

11. The system of claim 10, including an application extractor that is configured to extract messages corresponding to the application from an output of the network simulator.

12. The system of claim 11, wherein the application extractor is configured to provide a graphic representation of the messages, and the user interface is configured to facilitate editing of the graphic representation to facilitate creation of additional messages that are added to the plurality of messages for subsequent input processing and network simulation.

13. The system of claim 10, wherein the network simulator is configured to simulate the propagation of packets at a transport-protocol-layer level.

14. The system of claim 13, including a plurality of network simulators that are each configured to model the network at different levels of precision.

15. The system of claim 13, wherein the application extractor is configured to provide a graphic representation of the messages, and the user interface is configured to facilitate modification of one or more attributes of at least one of the messages in the graphic representation for subsequent input processing and network simulation.

16. The system of claim 15, wherein the one or more attributes include at least one of: a time parameter, a size parameter, a source parameter, a destination parameter, and a dependency parameter.

17. The system of claim 10, wherein the input processor is further configured to process one or more scripts that facilitate generation of at least a portion of the plurality of messages.

18. The system of claim 17, wherein the input processor is configured to process at least one script of the one or more scripts that is written in a general-purpose programming language.

19. The system of claim 17, wherein the input processor is configured to facilitate modification of one or more attributes of at least one message based on at least one script of the one or more scripts.

20. The system of claim 17, wherein the model of the traffic includes traffic that is generated by at least one script of the one or more scripts.

21. The system of claim 10, wherein the user interface is configured to facilitate identification of dependencies between two or more of the messages of the plurality of messages.

22. A non-transitory computer-readable medium that is configured to store a computer program that, when executed on a processing system, is configured to cause the processing system to:

provide a user interface that facilitates a user's creation and manipulation of elements of a graphic representation of a propagation of a plurality of messages associated with an application, process the graphic representation to create a model of traffic associated with the application, and simulate a propagation of packets on a modeled network, based on the model of the traffic associated with the application, wherein the model of the traffic causes the processor to simulate the propagation of a plurality of the packets corresponding to at least one message of the plurality of messages.

23. The medium of claim 22, wherein the program is configured to cause the processor to process one or more scripts that facilitate generation of at least a portion of the plurality of messages.

24. The medium of claim 23, wherein the program is configured to cause the processor to modify one or more attributes of at least one message based on at least one script of the one or more scripts.

25. The medium of claim 23, wherein the model of the traffic includes traffic that is generated by at least one script of the one or more scripts.

26. The medium of claim 22, wherein the user interface is configured to facilitate identification of dependencies between two or more of the messages of the plurality of messages.

27. The medium of claim 22, wherein the program is configured to cause the processor to provide the graphic representation based on a simulation of the modeled network, and the user interface is configured to facilitate editing of the graphic representation to facilitate creation of additional messages that are added to the plurality of messages for subsequent input processing and network simulation.

28. The medium of claim 22, wherein the program is configured to cause the processor to provide the graphic representation based on a simulation of the modeled network, and the user interface is configured to facilitate modification of one or more attributes of at least one of the messages in the graphic representation for subsequent input processing and network simulation.

29. The medium of claim 28, wherein the one or more attributes include at least one of: a time parameter, a size parameter, a source parameter, a destination parameter, and a dependency parameter.

30. The medium of claim 22, wherein the graphic representation includes a data exchange chart that illustrates the propagation of the messages between tiers.

31. The medium of claim 30, wherein the user interface includes a graphic interface that facilitates creation of additional messages on the data exchange chart.

32. The medium of claim 30, wherein the user interface includes a graphic interface that facilitates modification of the messages on the data exchange chart.

* * * * *